US008358871B2

(12) United States Patent
Tu et al.

(10) Patent No.: US 8,358,871 B2
(45) Date of Patent: Jan. 22, 2013

(54) METHOD AND DEVICE FOR DETECTING AND CORRECTING SKEWED IMAGE DATA

(75) Inventors: Chien-Hui Tu, Taipei (TW); Cheng-Yueh Lo, Taipei (TW); De-Wei Huang, Taipei (TW); Yung-Hsi Wu, Taipei (TW)

(73) Assignee: AVerMedia Information, Inc., Taipei (TW)

( * ) Notice: Subject to any disclaimer, the term of this patent is extended or adjusted under 35 U.S.C. 154(b) by 848 days.

(21) Appl. No.: 12/473,554

(22) Filed: May 28, 2009

(65) Prior Publication Data

US 2010/0215285 A1 Aug. 26, 2010

(30) Foreign Application Priority Data

Feb. 20, 2009 (TW) ................................ 98105465 A

(51) Int. Cl.
*G06K 9/36* (2006.01)

(52) U.S. Cl. ........ 382/289; 348/618; 382/172; 382/176; 382/177; 382/220

(58) Field of Classification Search ........................ None
See application file for complete search history.

(56) References Cited

U.S. PATENT DOCUMENTS

| 5,521,985 A * | 5/1996 | Camp et al. ................... 382/176 |
| 6,064,778 A | 5/2000 | Pasco |
| 6,430,320 B1 | 8/2002 | Jia |
| 6,771,842 B1 | 8/2004 | Sakai |
| 6,856,697 B2 * | 2/2005 | Lee et al. ...................... 382/177 |
| 6,985,640 B2 | 1/2006 | Schweid |
| 7,027,666 B2 | 4/2006 | Rudak |
| 7,110,568 B2 | 9/2006 | Arcas-Luque et al. |
| 7,133,573 B2 | 11/2006 | Brugger |
| 7,200,285 B2 | 4/2007 | Li |
| 7,277,600 B2 | 10/2007 | Najman |
| 7,336,813 B2 | 2/2008 | Prakash |
| 2002/0131642 A1 * | 9/2002 | Lee et al. ...................... 382/220 |
| 2003/0128895 A1 * | 7/2003 | Schweid ....................... 382/289 |
| 2005/0281483 A1 * | 12/2005 | Teng .............................. 382/289 |
| 2009/0316987 A1 * | 12/2009 | Ouyang ........................ 382/172 |
| 2010/0238356 A1 * | 9/2010 | Kida et al. .................... 348/618 |

FOREIGN PATENT DOCUMENTS

| JP | 11331558 A | 11/1999 |
| JP | 2004128643 A | 4/2004 |

OTHER PUBLICATIONS

Fahn et al. "A featureless image registration method for deskewed document images" Journal of Technology, vol. 21, No. 4, pp. 405-414, 2006.

* cited by examiner

*Primary Examiner* — Tsung-Yin Tsai
(74) *Attorney, Agent, or Firm* — Kirton McConkie; Evan R. Witt

(57) ABSTRACT

A skewed image data detecting and correcting device includes a skew angle detecting module, and an image rotating correction module. A skewed image data detecting and correcting method includes the following steps. Firstly, a binary digitizing operation is performed to obtain a binary image data. The binary image data is rotated by multiple different rotating angles, thereby obtaining multiple rotated binary image data. The pixel numbers of all horizontal rows of the rotated binary image data are totalized, thereby obtaining multiple horizontal pixel number distribution curves. A high-pass filtering procedure is performed to filter off low-frequency noise, thereby obtaining multiple high-frequency signal curves. The square sums of respective high-frequency signal curves are calculated, thereby obtaining multiple index values. Afterward, a rotating correction operation is performed on the image data according to the rotating angle corresponding to a maximum of the index values, thereby obtaining a corrected image data.

12 Claims, 7 Drawing Sheets

AAAAAAAAAAAAAAAAAAAA
BBBBBBBBBBBBBBBBBB
CCCCCCCCCCCCCCCC
DDDDDDDDDDDDDDDDDD

最新公告
AAAAAAAAAAAAAAAAAAAA
BBBBBBBBBBBBBBBBBB
CCCCCCCCCCCCCCCC
DDDDDDDDDDDDDDDDDD

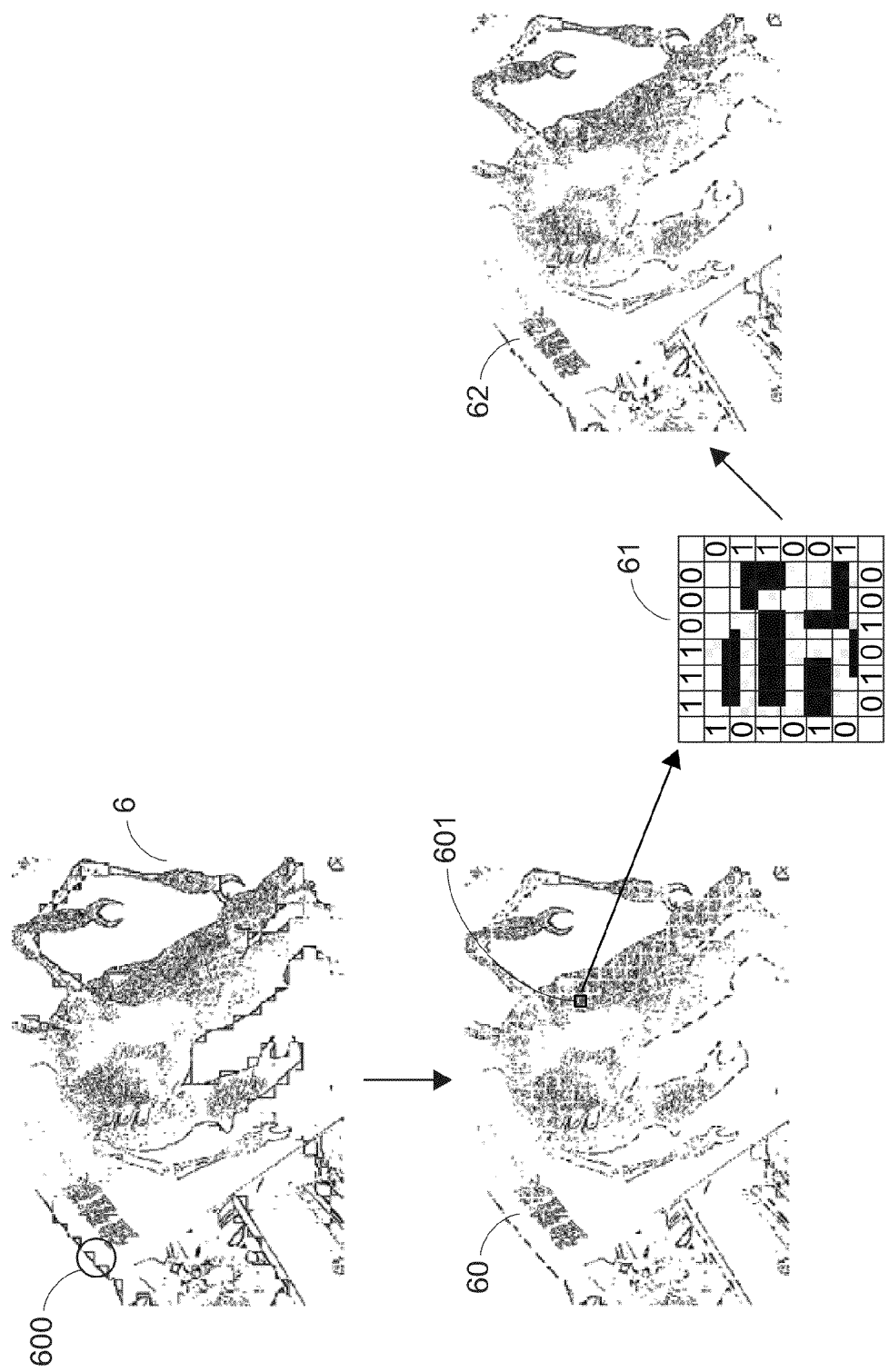

METHOD AND DEVICE FOR DETECTING AND CORRECTING SKEWED IMAGE DATA

FIELD OF THE INVENTION

The present invention relates to a method and a device for detecting and correcting skewed image data, and more particularly to a method and a device for detecting and correcting skewed image data in an image processing apparatus.

BACKGROUND OF THE INVENTION

With increasing development of digitalized technologies, a variety of image processing apparatuses are used for scanning images of documents into electronic files. The common image processing apparatuses include for example scanners, printers, copiers, facsimile machines, document cameras, and the like.

If the document is askew placed during the process of scanning or capturing a document, or if the document is skewed during the process of transporting the document within the image processing apparatus, a skewed document image is readily obtained. For enhancing the image quality, a skewed document detection and correction technology plays an important role in the field of document analysis systems. The challenge of the skewed document detection and correction technology is to remove the non-text symbols (e.g. graphs) of the document. There are several critical approaches for removing the non-text symbols. In accordance with a first approach, adjacent pixels are combined as respective new objects, then the possible text-objects are counted and retained, and finally the remainder objects are removed. The first approach usually needs a great quantity of memory capacity. In addition, the first approach is only applicable when the text size and the image noise comply with a specified condition. In accordance with a second approach, the text portion is transformed into multiple lines by computations, then the rotating angles of the text lines are calculated, and finally a skew angle of the document is estimated according to the rotating angles. The second approach removes the non-text symbols (e.g. graphs) of the document while ignoring the document contents. According to four corners or boundaries realized from the color difference between the document and the background, the skew degree is obtained. If the color difference is not evident or the boundary is beyond the scanning range, the second approach is not applicable. The prior art technologies need a great quantity of memory capacity to store the sorted and statistic data and thus are not suitably implemented by hardware components.

Therefore, there is a need of providing improved method and device for detecting and correcting skewed image data to obviate the drawbacks encountered from the prior art.

SUMMARY OF THE INVENTION

In accordance with an aspect of the present invention, there is provided a skewed image data detecting and correcting method for use in an image processing apparatus. The skewed image data detecting and correcting method includes the following steps. First of all, an image data is received and a binary digitizing operation is performed on the image data to obtain a binary image data, wherein each pixel of the binary image data is expressed by a single bit. Then, the binary image data is rotated by multiple different rotating angles, thereby obtaining multiple rotated binary image data. Then, pixel numbers of all horizontal rows of the rotated binary image data are totalized, thereby obtaining corresponding multiple horizontal pixel number distribution curves. Then, a high-pass filtering procedure is performed to filter off low-frequency noise contained in the horizontal pixel number distribution curves, thereby obtaining corresponding multiple high-frequency signal curves. Then, the square sums of respective high-frequency signal curves are calculated, thereby obtaining corresponding multiple index values. Afterward, a rotating correction operation is performed on the image data according to the rotating angle corresponding to a maximum of the index values, thereby obtaining a corrected image data.

In an embodiment, the image data is obtained by scaling down an original image data.

In an embodiment, before the binary digitizing operation is performed, the scaled-down image data is divided into multiple n×n cells, a brightness inversion operation is performed on all pixels of the n×n cells that have more than half of pixels are ranged from the medium level to the full black level, and the high-frequency noise at the borders of the n×n cells is deleted. In addition, after the binary digitizing operation is performed, the borders of the n×n cells are reconstructed by interpolation or extrapolation with neighboring pixels.

In an embodiment, the step of rotating the binary image data by multiple different rotating angles to obtain multiple rotated binary image data includes sub-steps of rotating the binary image data by a first rotating angle to obtain a first rotated binary image data, and rotating the binary image data by a second rotating angle to obtain a second rotated binary image data if the first rotating angle is within a searching angle range.

In an embodiment, the step of calculating the square sums of respective high-frequency signal curves is implementing by the square sums of only the positive value portions of the high-frequency signal curves.

In an embodiment, an inverse value of the rotating angle corresponding to the maximum of the index values denotes a skew angle of the image data.

In accordance with another aspect of the present invention, there is provided a skewed image data detecting and correcting device of an image processing apparatus. The skewed image data detecting and correcting device includes a skew angle detecting module and an image rotating correction module. The skew angle detecting module implements the following procedures: receiving an image data and performing a binary digitizing operation on the image data to obtain a binary image data, rotating the binary image data by multiple different rotating angles to obtain multiple rotated binary image data, totalizing pixel numbers of all horizontal rows of the rotated binary image data to obtain corresponding multiple horizontal pixel number distribution curves, performing a high-pass filtering procedure to filter off low-frequency noise contained in the horizontal pixel number distribution curves to obtain corresponding multiple high-frequency signal curves, calculating the square sums of respective high-frequency signal curves to obtain corresponding multiple index values, and detecting a skew angle of the image data according to the rotating angle corresponding to a maximum of the index values. The image rotating correction module is communicated with the skew angle detecting module for performing a rotating correction operation on the image data according to the skew angle, thereby obtaining a corrected image data.

In an embodiment, the image data is obtained by scaling down an original image data. The image rotating correction module performs the rotating correction operation on the original image data according to the skew angle, thereby obtaining a corrected original image data.

In an embodiment, the skew angle detecting module includes a pre-processing module, a memory, a projection profile processor, a high-pass filter, and a statistics data collection and skew angel discriminator.

BRIEF DESCRIPTION OF THE DRAWINGS

The above contents of the present invention will become more readily apparent to those ordinarily skilled in the art after reviewing the following detailed description and accompanying drawings, in which:

FIG. 6 schematically illustrates a process of deleting the high-frequency noise at the borders of the n×n cells and reconstructing the blank regions by interpolation or extrapolation with the neighboring pixels.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
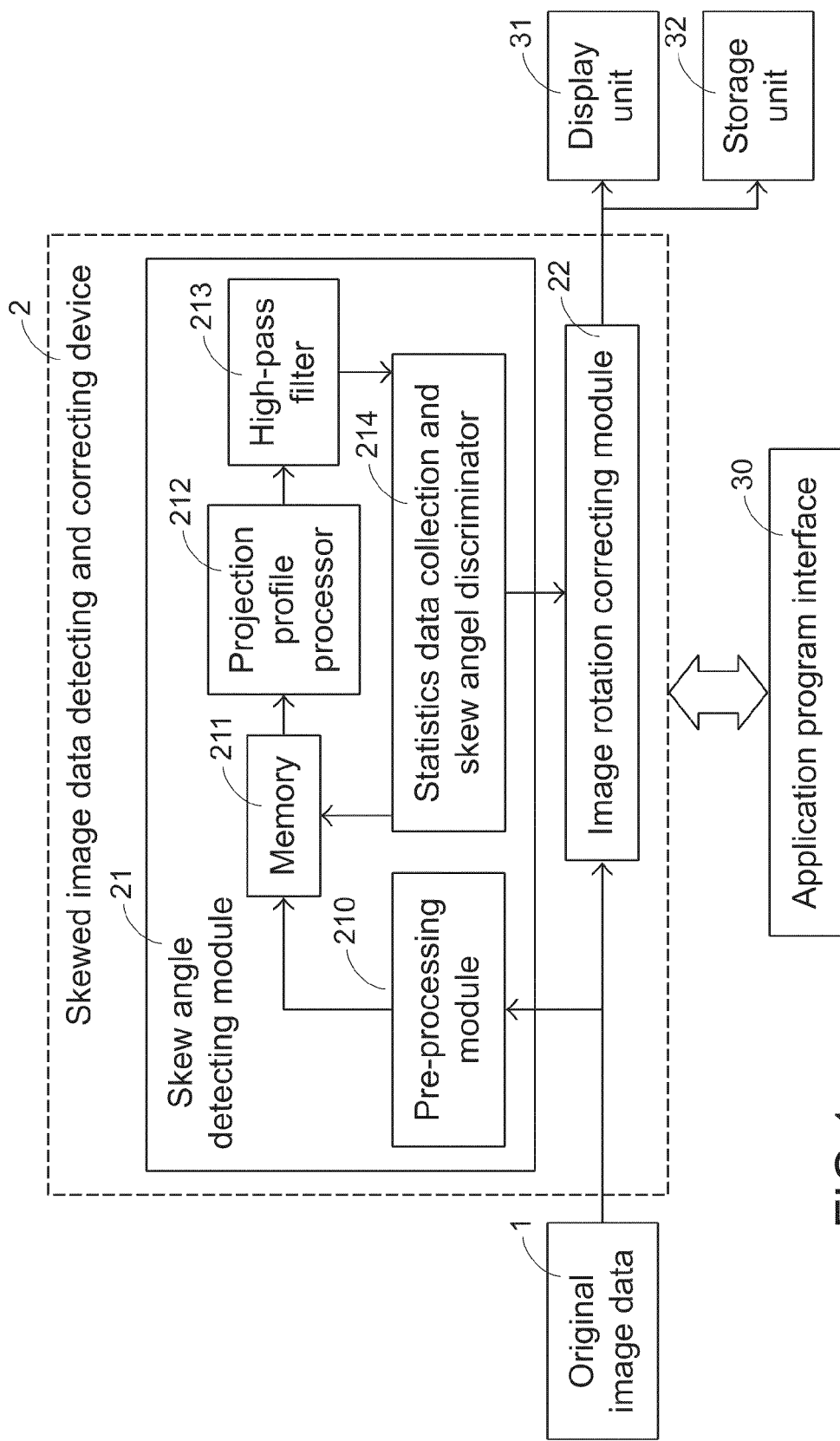
FIG. 1 is a schematic functional block diagram illustrating a skewed image data detecting and correcting device according to an embodiment of the present invention.

FIG. 1 is a schematic functional block diagram illustrating a skewed image data detecting and correcting device according to an embodiment of the present invention. The skewed image data detecting and correcting device 2 includes a skew angle detecting module 21 and an image rotation correcting module 22. After an original image data 1 is processed by the skew angle detecting module 21, a skew angle of the original image data 1 is realized. The information associated with the skew angle is then transmitted from the angle detecting module 21 to the image rotating correction module 22. According to the skew angle, the image rotating correction module 22 performs a rotating correction operation on the original image data 1, thereby obtaining a corrected image data. The corrected image data is transmitted to the back-end display unit 31 for display or the storage unit 32 for storage.

As shown in FIG. 1, the skew angle detecting module 21 comprises a pre-processing module 210, a memory 211, a projection profile processor 212, a high-pass filter 213, and a statistics data collection and skew angel discriminator 214.

Figure 2:
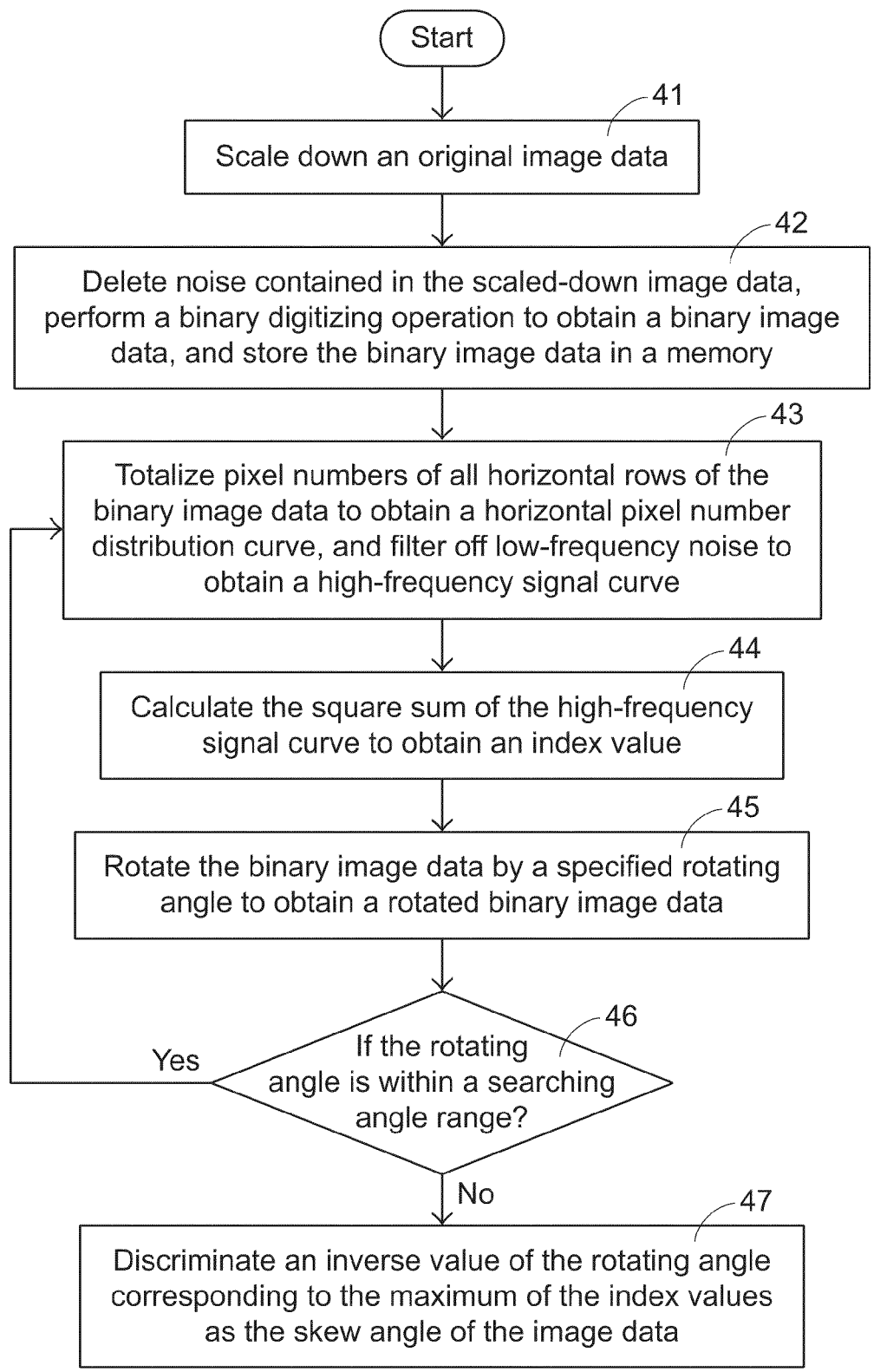
FIG. 2 schematically illustrates a flowchart of a skewed image data detecting and correcting method according to the present invention.

FIG. 2 schematically illustrates a flowchart of a skewed image data detecting and correcting method according to the present invention. Hereinafter, the skewed image data detecting and correcting method will be illustrated in more details with reference to FIGS. 1 and 2.

First of all, an original image data 1 is received by the pre-processing module 210 and the pre-processing module 210 performs a scaling-down operation on the original image data 1 (Step 41). For example, the original image data 1 is scaled down to have a 256×192 pixel resolution in order to save the memory usage. Alternatively, the procedure of performing the scaling-down operation may be omitted. Without the scaling-down operation, the memory usage is relatively larger and the computing load is heavier.

Next, a pre-processing operation is performed on the scaled-down image data by the pre-processing module 210. In this embodiment, the pre-processing operation is a binary digitizing operation for processing the scaled-down image data into a binary image data. In the binary image data, each pixel is expressed by a single bit. The binary image data is then stored in the memory 211 (Step 42).

Next, the binary image data stored in the memory 211 is read out by the projection profile processor 212. The pixel numbers (0 or 1) of all horizontal rows of the binary image data are respectively totalized by the projection profile processor 212, thereby obtaining a horizontal pixel number distribution curve. The low-frequency noise contained in the horizontal pixel number distribution curve is filtered off by the high-pass filter 213, thereby obtaining a high-frequency signal curve (Step 43). Next, the square sum of the high-frequency signal curve is calculated by the statistics data collection and skew angel discriminator 214, thereby obtaining an index value (Step 44).

Next, the binary image data stored in the memory 211 is read out by the statistics data collection and skew angel discriminator 214. The binary image data is rotated by a specified rotating angle, thereby obtaining a rotated binary image data (Step 45). If the specified rotating angle falls into a searching angle range (Step 46), the Step 43 and the Step 44 are repeatedly done and thus another index value corresponding to the specified rotating angle is obtained. Until the specified rotating angle is beyond the searching angle range (Step 46), a maximum index value is selected from all of these index values. The inverse value of the rotating angle corresponding to the maximum index value denotes the skew angle of the image data (Step 47). The information associated with the skew angle is then transmitted from the angle detecting module 21 to the image rotating correction module 22. According to the skew angle, the image rotating correction module 22 performs a rotating correction operation on the original image data 1, thereby obtaining a corrected image data. The corrected image data is transmitted to the back-end display unit 31 for display or the storage unit 32 for storage. As shown in FIG. 2, the skewed image data detecting and correcting device 2 is further communicated with an application program interface 30. Via the application program interface 30, the specified rotating angle and the searching angle range could be preset in the statistics data collection and skew angel discriminator 214.

As known, if the document image contains white texts on a black background, erroneous discrimination is often rendered according to the prior art method. For minimizing the possibility of causing erroneous discrimination, the skewed image data detecting and correcting method of the present invention tries to emphasize the text characteristics, eliminate some noise, and reduce the interference from the non-text symbols. In some embodiments, before the step of processing the scaled-down image data into the binary image data (Step 42), a brightness inversion operation is performed. The gray levels of the pixels included in the scaled-down image data are ranged from full white (e.g. level 0) to full black (e.g. level 255). For every n×n cell, if more than half of pixels are ranged from the medium level to the full black level, the brightness inversion operation is carried out. For example, if at least 32 pixels in an 8×8 cell are ranged from the medium level (e.g. 128) to the full black level (e.g. 255), the brightness inversion operation is performed on all pixels in the 8×8 cell. Due to the brightness inversion operation, the erroneous discrimination is minimized or eliminated and the correction accuracy is enhanced.

Figure 5:
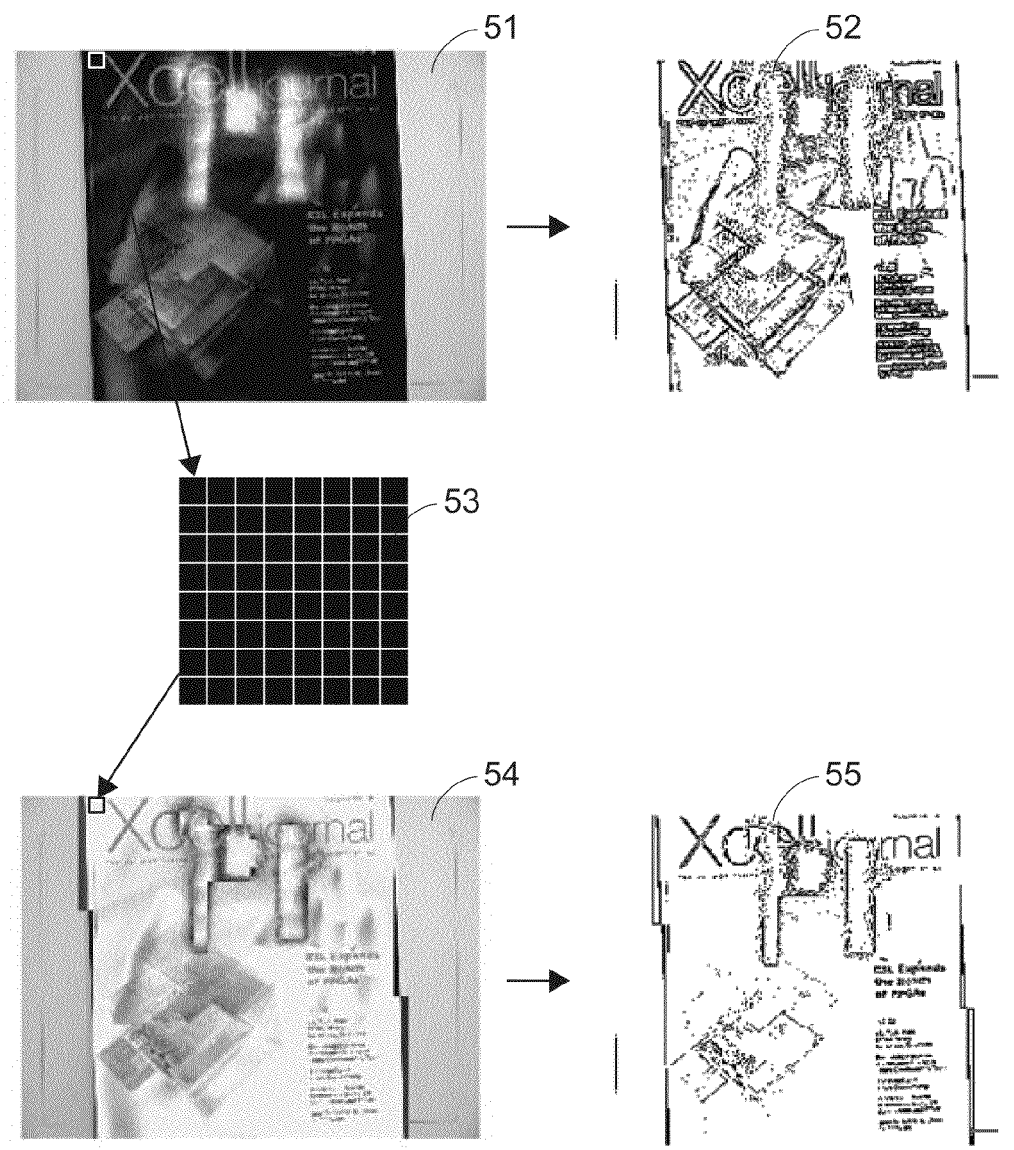
FIG. 5 schematically illustrates the efficacy of performing the brightness inversion operation on the image data.

FIG. 5 schematically illustrates the efficacy of performing the brightness inversion operation on the image data. In case that a white-text-on-black-background image 51 is directly subject to a binary digitizing operation, a binary image 52 is obtained. In the binary image 52, the text symbols and the non-text symbols (e.g. graphs) are not considerably distinguished. If the 8×8 cell 53 is subject to a brightness inversion operation, a brightness-inversed image 54 is obtained. The brightness-inversed image 54 is then subject to a binary digitizing operation, thereby obtaining another binary image 55. In comparison with the binary image 52, the text characteristics of the binary image 55 are emphasized and thus the possibility of causing erroneous discrimination is reduced.

It is noted that the dimension of the n×n cell could be altered as required or according to the scaled-down image data. The brightness inversion operation, however, may produce undesirable high-frequency noise in the binary image because the brightness values of the neighboring cells are very distinct from each other.

Please refer to FIG. 6. Due to high-frequency noise, sawtoothed lines 600 are possibly generated in the binary image 6 at the borders of the n×n cells. If the high-frequency noise at the borders is directly deleted, grid-like blank regions 601 are possibly generated in the binary image 6. By interpolation or extrapolation with the neighboring pixels, proper pixel numbers of the blank regions 601 of an 8×8 cell 61 are reconstructed. As such, the high-frequency noise included in the reconstructed image 62 is minimized.

Figure 3A:
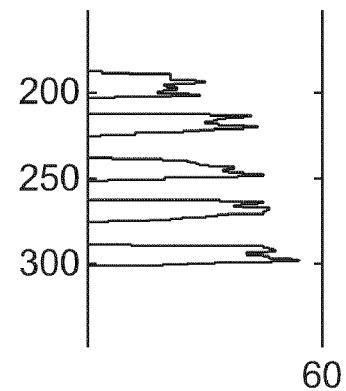
FIG. 3A schematically illustrates a horizontal pixel number distribution curve obtained by totalizing pixel numbers of all horizontal rows of the binary image data of a non-skewed pure-text image.
Figure 3B:
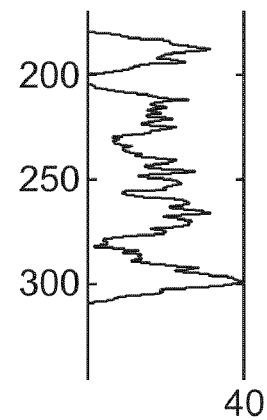
FIG. 3B schematically illustrates a horizontal pixel number distribution curve obtained by totalizing pixel numbers of all horizontal rows of the binary image data of a slightly skewed pure-text image.

FIG. 3A schematically illustrates a horizontal pixel number distribution curve obtained by totalizing pixel numbers of all horizontal rows of the binary image data of a non-skewed pure-text image. FIG. 3B schematically illustrates a horizontal pixel number distribution curve obtained by totalizing pixel numbers of all horizontal rows of the binary image data of a slightly skewed pure-text image. As shown in FIG. 3A, the horizontal projection profile peak value (e.g. 60) of the non-skewed pure-text image is greater than the horizontal projection profile peak value (e.g. 40) of the slightly skewed pure-text image.

Figure 4A:
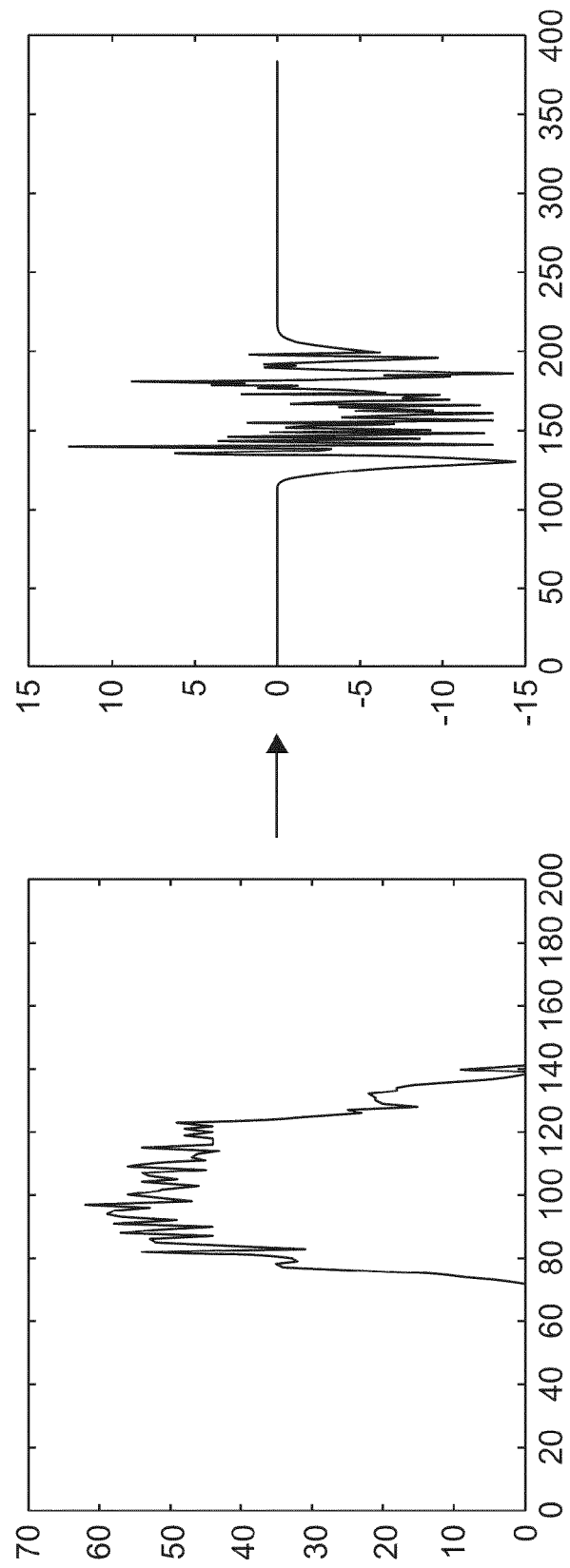
FIGS. 4A and 4B schematically illustrate high-frequency signal curves obtained by filtering off low-frequency noise contained in the horizontal pixel number distribution curves.
Figure 4B:
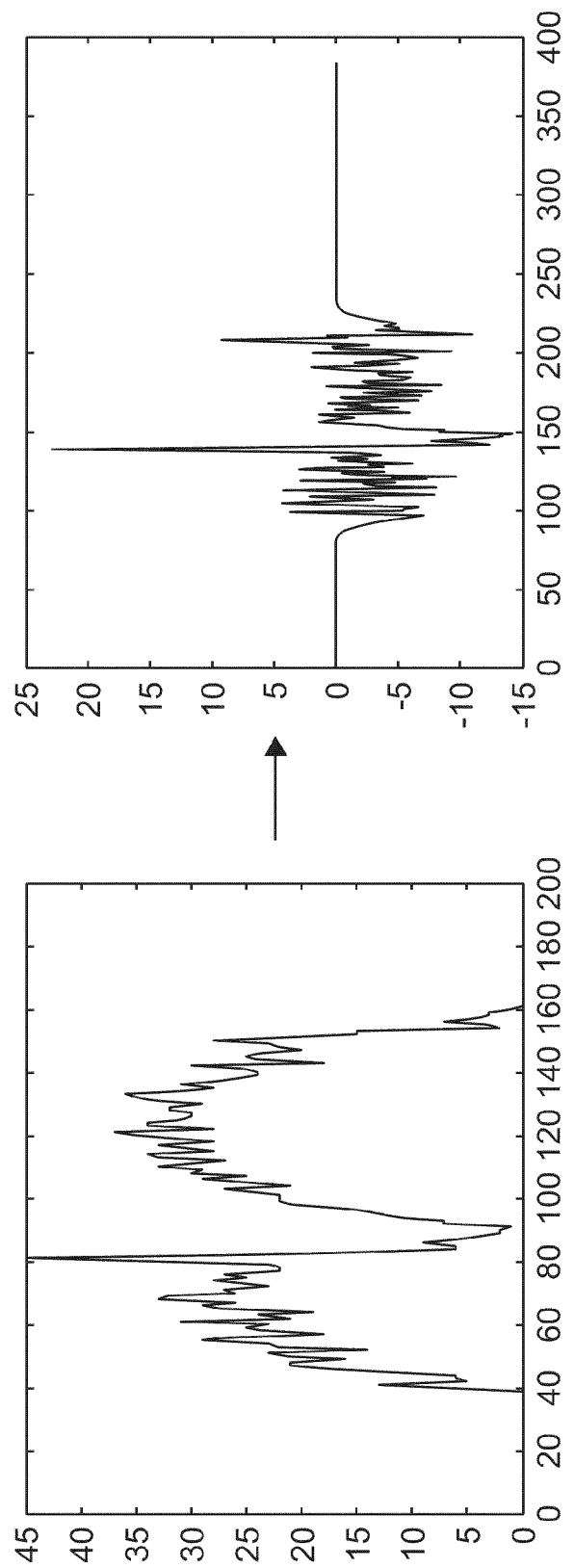

Although the horizontal projection profile peak value is effective to distinguish the non-skewed pure-text image from the slightly skewed pure-text image, there is still a drawback. That is, if the image contains both text symbols and non-text symbols, the efficacy of using the horizontal projection profile peak value to discriminate the skewed amount is largely reduced. The inventor also fount that the peak and trough of the horizontal projection profile are very distinguished. According to the present invention, the low-frequency noise contained in the horizontal pixel number distribution curve is filtered off by the high-pass filter 213, thereby obtaining a high-frequency signal curve. As shown in FIGS. 4A and 4B, the horizontal projection profile of the skewed document or the horizontal projection profile of non-text symbols (e.g. graphs) of the document is declined. An example of the high-pass filter 213 includes but is not limited to a finite impulse response (FIR) filter.

The high-frequency signal curve is transmitted to the statistics data collection and skew angel discriminator 214. The square sum of the high-frequency signal curve is calculated by the statistics data collection and skew angel discriminator 214, thereby obtaining an index value. In some embodiment, the square sum of only the positive value portion of the high-frequency signal curve is calculated by the statistics data collection and skew angel discriminator 214 in order to increase the weight of the peaks.

Moreover, the binary image data is rotated by multiple different rotating angle within the within a searching angle range. For finding the skew angle of the skewed document, a two-stage searching process is performed. In the first stage, the binary image data is rotated by 5 degrees each time within a searching angle range between −45 degrees and +45 degrees, thereby obtaining multiple rotated binary image data. Next, multiple index values corresponding to the rotating angles are obtained. A maximum index value corresponding to a first-stage rotating angle is selected from all of these index values. With respect to the first-stage rotating angle, the binary image data is rotated by 1 degree each time within another searching angle range between −5 degrees and +5 degrees. Next, multiple index values corresponding to the rotating angles are obtained. A maximum index value corresponding to a second-stage rotating angle is selected from all of these index values. According to the first-stage rotating angle and the second-stage rotating angle, the skew angle of the skewed document could be precisely detected. The information associated with the skew angle is then transmitted from the angle detecting module 21 to the image rotating correction module 22. According to the skew angle, the image rotating correction module 22 performs a rotating correction operation on the original image data 1, thereby obtaining a corrected image data. The corrected image data is transmitted to the back-end display unit 31 for display or the storage unit 32 for storage.

From the above description, the present invention is effective for detecting and correcting skewed image data in an image processing apparatus. The image processing apparatus includes for example a scanner, a printer, a copier, a facsimile machine, a document camera, and the like. The skewed image data detecting and correcting method of the present invention can detect and correct the skewed image by using reduced hardware resource without the need of removing the non-text symbols. Moreover, since the device and method of the present invention could be implemented by hardware components, the memory capacity is saved to store the sorted and statistic data. The skewed image data detecting and correcting method could be applied to any photoelectric system having the image processing apparatus.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A skewed image data detecting and correcting method for use in an image processing apparatus, the skewed image data detecting and correcting method comprising steps of:

receiving an image data, and performing a binary digitizing operation on the image data to obtain a binary image data, wherein each pixel of the binary image data is expressed by a single bit;

rotating the binary image data by multiple different rotating angles, thereby obtaining multiple rotated binary image data;

totalizing pixel numbers of all horizontal rows of the rotated binary image data, thereby obtaining corresponding multiple horizontal pixel number distribution curves;

performing a high-pass filtering procedure to filter off low-frequency noise contained in the horizontal pixel number distribution curves, thereby obtaining corresponding multiple high-frequency signal curves;

calculating square sums of respective high-frequency signal curves, thereby obtaining corresponding multiple index values; and performing a rotating correction operation on the image data according to the rotating angle corresponding to a maximum of the index values, thereby obtaining a corrected image data.

2. The skewed image data detecting and correcting method according to claim 1 wherein the image data is obtained by scaling down an original image data.

3. The skewed image data detecting and correcting method according to claim 2 wherein before the binary digitizing operation is performed, the scaled-down image data is divided into multiple n×n cells, a brightness inversion operation is performed on all pixels of the n×n cells that have more than half of pixels are ranged from the medium level to the full black level, and the high-frequency noise at the borders of the n×n cells is deleted; and after the binary digitizing operation is performed, the borders of the n×n cells are reconstructed by interpolation or extrapolation with neighboring pixels.

4. The skewed image data detecting and correcting method according to claim 1 wherein the step of rotating the binary image data by multiple different rotating angles to obtain multiple rotated binary image data includes sub-steps of:
    rotating the binary image data by a first rotating angle to obtain a first rotated binary image data; and
    rotating the binary image data by a second rotating angle to obtain a second rotated binary image data if the first rotating angle is within a searching angle range.

5. The skewed image data detecting and correcting method according to claim 1 wherein the step of calculating the square sums of respective high-frequency signal curves is implementing by the square sums of only the positive value portions of the high-frequency signal curves.

6. The skewed image data detecting and correcting method according to claim 1 wherein an inverse value of the rotating angle corresponding to the maximum of the index values denotes a skew angle of the image data.

7. A skewed image data detecting and correcting device of an image processing apparatus, the skewed image data detecting and correcting device comprising:
    a skew angle detecting module for receiving an image data and performing a binary digitizing operation on the image data to obtain a binary image data, rotating the binary image data by multiple different rotating angles to obtain multiple rotated binary image data, totalizing pixel numbers of all horizontal rows of the rotated binary image data to obtain corresponding multiple horizontal pixel number distribution curves, performing a high-pass filtering procedure to filter off low-frequency noise contained in the horizontal pixel number distribution curves to obtain corresponding multiple high-frequency signal curves, calculating square sums of respective high-frequency signal curves to obtain corresponding multiple index values, and detecting a skew angle of the image data according to the rotating angle corresponding to a maximum of the index values; and
    an image rotating correction module communicated with the skew angle detecting module for performing a rotating correction operation on the image data according to the skew angle, thereby obtaining a corrected image data.

8. The skewed image data detecting and correcting device according to claim 7 wherein the image data is obtained by scaling down an original image data, and the image rotating correction module performs the rotating correction operation on the original image data according to the skew angle, thereby obtaining a corrected original image data.

9. The skewed image data detecting and correcting device according to claim 7 wherein the skew angle detecting module comprises:
    a pre-processing module for receiving the image data, and performing the binary digitizing operation on the image data to obtain the binary image data;
    a memory communicated with the pre-processing module for storing the binary image data;
    a projection profile processor communicated with the memory for totalizing pixel numbers of all horizontal rows of the rotated binary image data, thereby obtaining the horizontal pixel number distribution curves;
    a high-pass filter communicated with the projection profile processor for performing the high-pass filtering procedure to filter off low-frequency noise contained in the horizontal pixel number distribution curves, thereby obtaining corresponding multiple high-frequency signal curves; and
    a statistics data collection and skew angle discriminator communicated with the image rotating correction module, the high-pass filter and the memory for rotating the binary image data by multiple different rotating angles to obtain the rotated binary image data, calculating the square sums of respective high-frequency signal curves to obtain the index values, detecting the skew angle of the image data according to the rotating angle corresponding to the maximum of the index values, and transmitting the skew angle to the image rotating correction module.

10. The skewed image data detecting and correcting device according to claim 9 wherein before the binary digitizing operation is performed, the scaled-down image data is divided into multiple n×n cells, a brightness inversion operation is performed on all pixels of the n×n cells that have more than half of pixels are ranged from the medium level to the full black level, and the high-frequency noise at the borders of the n×n cells is deleted; and after the binary digitizing operation is performed, the borders of the n×n cells are reconstructed by interpolation or extrapolation with neighboring pixels.

11. The skewed image data detecting and correcting device according to claim 9 wherein the statistics data collection and skew angle discriminator calculates the square sums of only the positive value portions of the high-frequency signal curves.

12. The skewed image data detecting and correcting device according to claim 9 wherein the statistics data collection and skew angle discriminator discriminates an inverse value of the rotating angle corresponding to the maximum of the index values as the skew angle of the image data.

* * * * *